United States Patent [19]

Noro et al.

[11] Patent Number: 5,646,384
[45] Date of Patent: Jul. 8, 1997

[54] TURN SIGNAL CANCEL DEVICE

[75] Inventors: Yoshimi Noro; Harumi Doke, both of Aichi, Japan

[73] Assignee: Kabushiki Kaisha Tokai Rika Denki Seisakusho, Aichi, Japan

[21] Appl. No.: 313,463

[22] Filed: Sep. 27, 1994

[30] Foreign Application Priority Data

Sep. 28, 1993 [JP] Japan .................. 5-52402

[51] Int. Cl.⁶ .................................... H01H 3/16
[52] U.S. Cl. ........................................ 200/61.3
[58] Field of Search ............... 200/61.27, 61.3, 200/61.31, 61.32, 61.33, 61.34, 61.35, 61.36, 61.38, 61.54

[56] References Cited

U.S. PATENT DOCUMENTS

| | | | |
|---|---|---|---|
| 3,794,785 | 2/1974 | Tomlinson | 200/61.27 |
| 4,739,131 | 4/1988 | Maeda | 200/61.27 |
| 5,030,802 | 7/1991 | Noro | 200/61.27 |
| 5,313,028 | 5/1994 | DuRocher | 200/61.27 |
| 5,385,067 | 1/1995 | Wiersing et al. | 74/484 R |

*Primary Examiner*—Michael L. Gellner
*Assistant Examiner*—Michael A. Friedhofer
*Attorney, Agent, or Firm*—Finnegan, Henderson, Farabow, Garrett & Dunner, L.L.P.

[57] ABSTRACT

A turn signal cancel device includes a body to which is mounted a bracket including an operation lever and a back plate mounted thereto. In the bracket, there are provided balls and, if the balls are engaged with a moderation member, then the bracket can be held at its right turn direction position. Also, a ratchet is disposed in the body and, if the ratchet is rotated, then the surface to be pressed of the back plate is pressed by the pressure surface of the ratchet so that the bracket is rotated and returned to its neutral position. In this case, the ratchet includes an inclined pressure surface and, as the ratchet is rotated, the contact portion between the pressure surface of the ratchet and the surface to be pressed of the back plate is moved from a point α in the ratchet to a point α'.

2 Claims, 7 Drawing Sheets

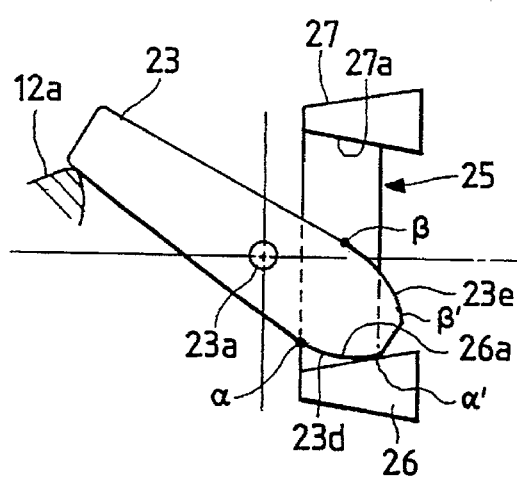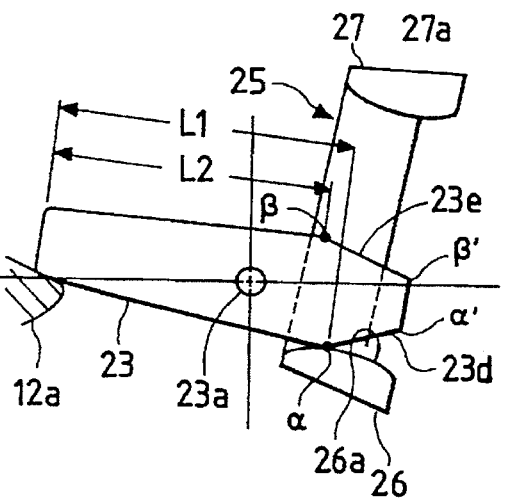

TURN SIGNAL CANCEL DEVICE

BACKGROUND OF THE INVENTION

1. Field of the Invention

The present invention relate to a turn signal cancel device which automatically rotates and returns an operation lever, which has been operated to indicate the turn direction of a vehicle, to its neutral position.

2. Related Art

Description will be given below of a conventional structure of a turn signal cancel device of this type with reference to FIG. 11. That is, a bracket 2 is mounted to a body 1 in such a manner that it can be rotated about a shaft 2a, and an operation lever 3 and a back plate 4 are respectively mounted to the bracket 2. Also, a ball 5 is mounted on the bracket 2 and the ball 5 is in engagement with an uneven surface 1a formed in the body 1. According to this structure, the operation portion side of the operation lever 3 can be selectively held at a horizontal neutral position, a downwardly inclined right turn direction position, and an upwardly inclined left turn direction position. FIG. 11 illustrates a state in which the bracket 2 is held at the right turn direction position.

Also, a ratchet 6 is rotatably mounted to the body 1. While the bracket 2 is held at the right turn direction position, if a steering wheel (not shown) is turned, a cancel cam 7 is rotated in a direction of an arrow A shown in FIG. 11 into engagement with the leading end portion of the ratchet 6 to thereby rotate the ratchet 6 in a direction of an arrow B shown in FIG. 11. This causes a pressure portion 6a, which is located on the base end portion side of the ratchet 6, to press against a projected portion 4a provided in the back plate 4, so that the ratchet 2 is rotated and returned to its neutral position. In this structure, the pressure portion 6a of the ratchet 6 is rotated from its state that it is in surface contact with the projected portion 4a of the back plate 4. Therefore, the projected portion 4a of the back plate 4 is given a pressure by the end portion 6b of the pressure portion 6a of the ratchet 6 as well.

The end portion 6b of the pressure portion 6a is rotated at a high speed. That is, when the steering wheel is turned at a high speed, then the end portion 6b is rotated at a high speed. Therefore, in the conventional structure in which the back plate 4 is pressed by the end portion 6b rotating at a high speed, the fast turn of the steering wheel is easy to reflect on the rotational operation of the bracket 2.

In order to prevent this, a modification can be imagined. That is, as shown by a two-dot chained line in FIG. 11, the leading end portion of the ratchet 6 is cut out to form an inclined portion 6c, thereby reducing the engaging margin of the cancel cam 7 with the ratchet 6. This modification can reduce the quantity of rotation of the bracket 2, thereby preventing the fast turn of the steering wheel from reflecting on the rotational operation of the bracket 2. However, in this modification, there is produced a possibility that the turn of the steering wheel does not reflect on the rotational operation of the bracket 2.

SUMMARY OF THE INVENTION

The present invention aims at eliminating the drawbacks found in the above-mentioned conventional structure. Accordingly, it is an object of the invention to provide a turn signal cancel device which can prevent the fast turn of the steering wheel from reflecting on the rotational operation of the bracket and reduce a possibility that the turn of the steering wheel does not reflect on rotational operation of the bracket.

In attaining the above object, according to the invention, there is provided a turn signal cancel device comprising: a bracket mounted rotatably and including an operation lever and a back plate mounted thereto; selective hold means for selectively holding the bracket at its neutral position, right turn direction position, or left turn direction position; and, a ratchet rotatable by a steering wheel to press against the back plate of the bracket held at either its right or left turn direction position as it is rotated, whereby the bracket can be rotated and returned to the neutral position in accordance with the pressing operation of the ratchet, characterized in that the pressure surface of the ratchet or the surface to be pressed of the back plate are formed in such a manner that a contact position between them can be moved in a direction to part away from the rotation center side of the ratchet as the ratchet is rotated.

According to the present turn signal cancel device, the pressing operation against the back plate is firstly performed on the rotation center side of the ratchet which is rotated at a relatively slow speed and, after then, is performed on the end portion side thereof which is rotated at a high speed. Due to this, unlike the conventional device in which the back plate is pressed on the end portion side of the ratchet which is rotated at a high speed, the fast turn of the steering wheel is difficult to reflect on the rotational operation of the bracket to thereby prevent the fast turn of the steering wheel from reflecting on the rotational operation of the bracket. Also, since the quantity of rotation of the ratchet remains unchanged, reduce a possibility that the turn of the steering wheel does not reflect on rotational operation of the bracket.

DETAILED DESCRIPTION OF THE PREFERRED EMBODIMENTS

Now, description will be given below of an embodiment of a turn signal cancel device according to the invention with reference to FIGS. 1 to 10. At first, in FIG. 1, a barrel cam member 11 is connected to a steering wheel (not shown) and can be rotated integrally with the steering wheel. The barrel cam member 11 includes cancel cams 12a, 12b in the outer peripheral portion thereof and, when the steering wheel is turned, then the cancel cams 12a, 12b are rotated while drawing a locus shown by a two-dot chained line in FIG. 1.

Figure 2:
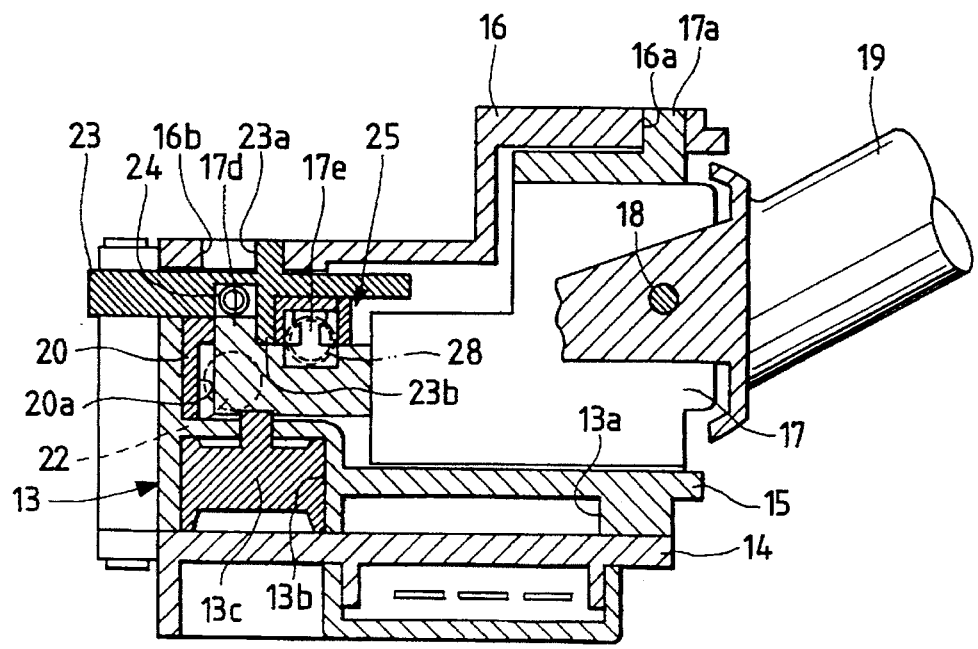
FIG. 2 is a longitudinally sectional side view of the main portions of the embodiment.

On the right side of the barrel cam member 11, there is located a body 13. The body 13, as shown in FIG. 2, includes a base plate 14, a case 15 put on the upper surface of the base plate 14, and a cover 16 which covers the upper surface of the case 15, while space portions 13a and 13b are formed between the base plate 14 and case 15. In the space portion 13a, there is stored a dimmer passing switch (not shown) and, in the space portion 13b, there is stored a turn signal switch (only the contact holder 13c is shown).

Figure 1:
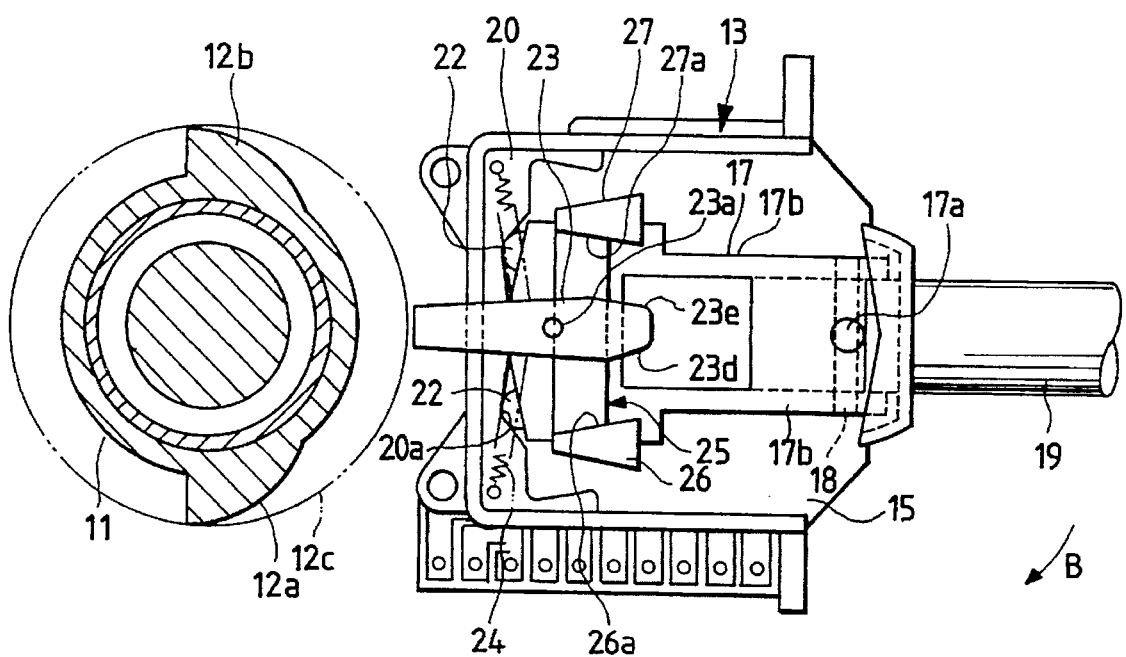
FIG. 1 is a top plan view of an embodiment of a turn signal cancel device according to the invention, with a cover removed.

In the case 15, as shown in FIG. 1, there is stored a bracket 17. The bracket 17 includes a pin 17a projecting on and from the upper surface thereof and, as shown in FIG. 2, the pin 17a is fitted into a hole 16a formed in the cover 16. This enables the bracket 17 to be rotated about the pin 17a. And, as the bracket 17 is rotated about the pin 17a, the state of the turn signal switch stored in the space portion 13b is switched to thereby energize or cut off the turn signal of a vehicle.

The bracket 17, as shown in FIG. 1, includes legs 17b, 17b and, between the legs 17b and 17b, as shown in FIG. 2, there is mounted an operation lever by means of a pin 18. This structure enables the operation lever 19 to be turned vertically. And, as the operation 19 is turned vertically, the state of the dimmer passing switch stored in the space portion 13a is switched.

Figure 3:
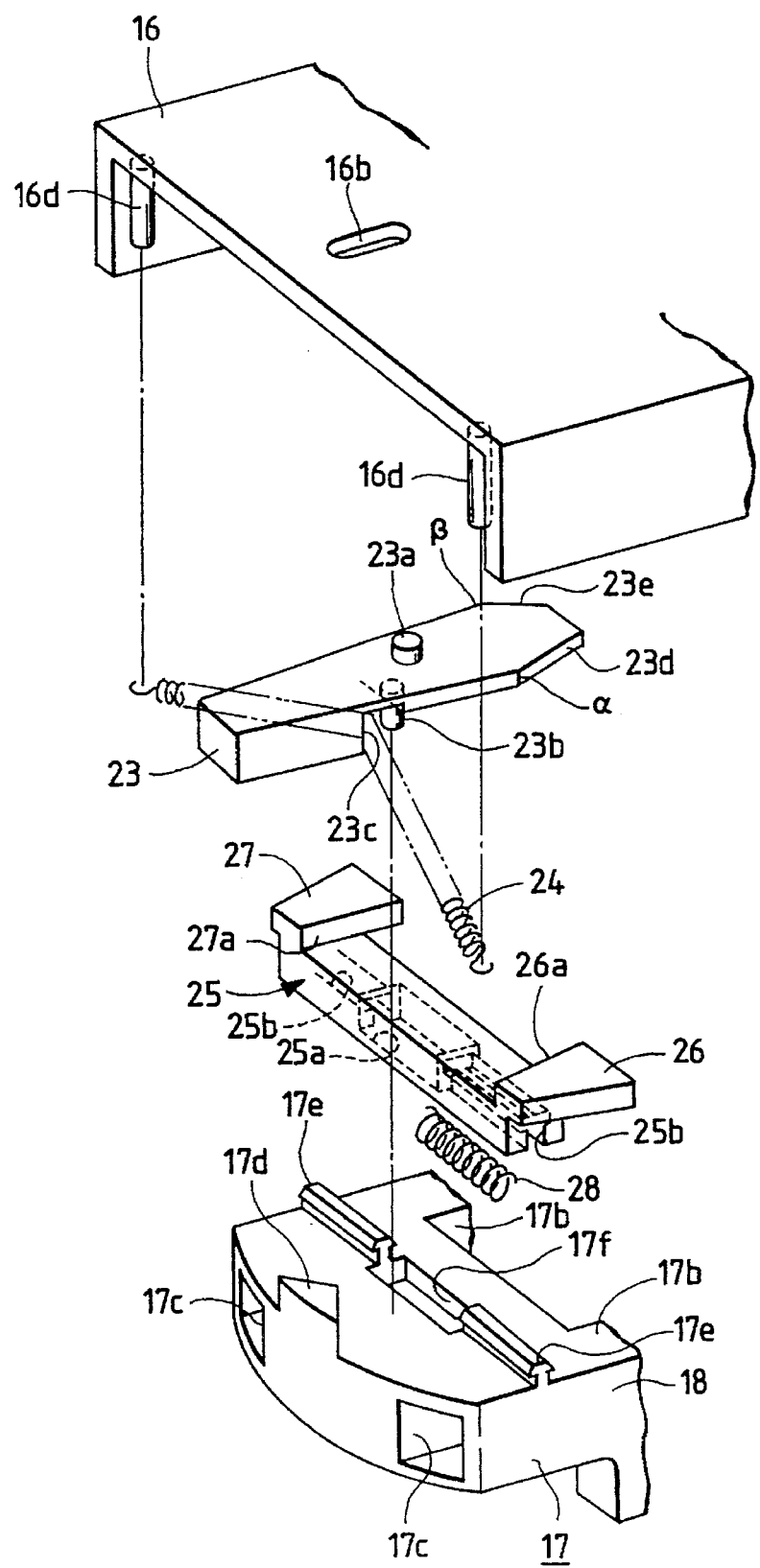
FIG. 3 is an exploded view of the main portions of the embodiment.
Figure 5:
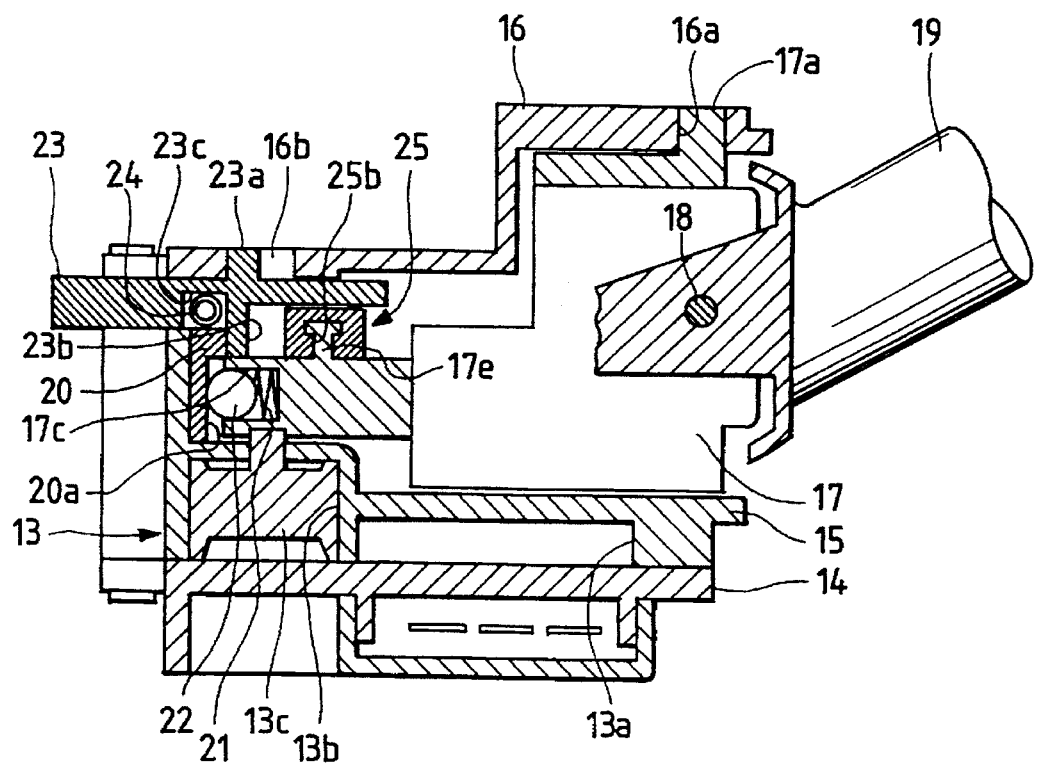
FIG. 5 is a view corresponding to FIG. 2, when an operation lever is rotationally operated to its right turn direction position.

Within the case 15, as shown in FIG. 1, there is disposed a locking body 20 having an uneven surface 20a. On the other hand, in the bracket 17, as shown in FIG. 3, there are formed storage holes 17c, 17c and, in the respective storage holes 17c, as shown in FIG. 5, there are stored a compression spring 21 and balls 22. The respective balls 22, as shown in FIG. 1, are pressed against and engaged with the uneven surface 20a, which allows the bracket 17 and operation lever 19 to be held at their respective neutral positions. Also, if the operation lever 19 is turned to its downwardly inclined right turn direction position (see FIG. 6) or to its upwardly inclined left turn direction position, then the engaging positions of the balls 22 with respect to the uneven surfaces 20a are moved, whereby the bracket 17 and operation lever 19 can be held selectively at their moved positions. That is, the locking body 20 and balls 22 serve as selective hold means.

Between the bracket 17 and cover 16, as shown in FIG. 2, there is provided a ratchet 23 which includes a guide pin 23a on the upper surface thereof. On the other hand, the cover 16 includes a long and narrow groove portion 16b into which the pin 23a of the ratchet 23 is fitted. Due to this, the ratchet 23 is allowed to advance, retreat and rotate along the groove portion 16b.

The ratchet 23, as shown in FIG. 3, includes a securing pin 23b and a stepped portion 23c in the lower surface thereof. A projection spring 24 hangs on the stepped portion 23c and also extends over pins 16b, 16b respectively provided in the cover 16. On the other hand, the bracket 17 includes a securing portion 17d formed in a trigonal prism shape and, when the bracket 17 is held at its neutral position, as shown in FIG. 2, the securing pin 23a of the ratchet 23 is secured to the securing portion 17d of the bracket 17. This structure, as shown in FIG. 1, prevents the ratchet 17 from moving into the rotational locus 12c of the cancel cams 12. Therefore, in this state, even if the cancel cams 12a, 12b are rotated, the cancel cams 12a, 12b are prevented from being engaged with the ratchet 23.

Figure 6:
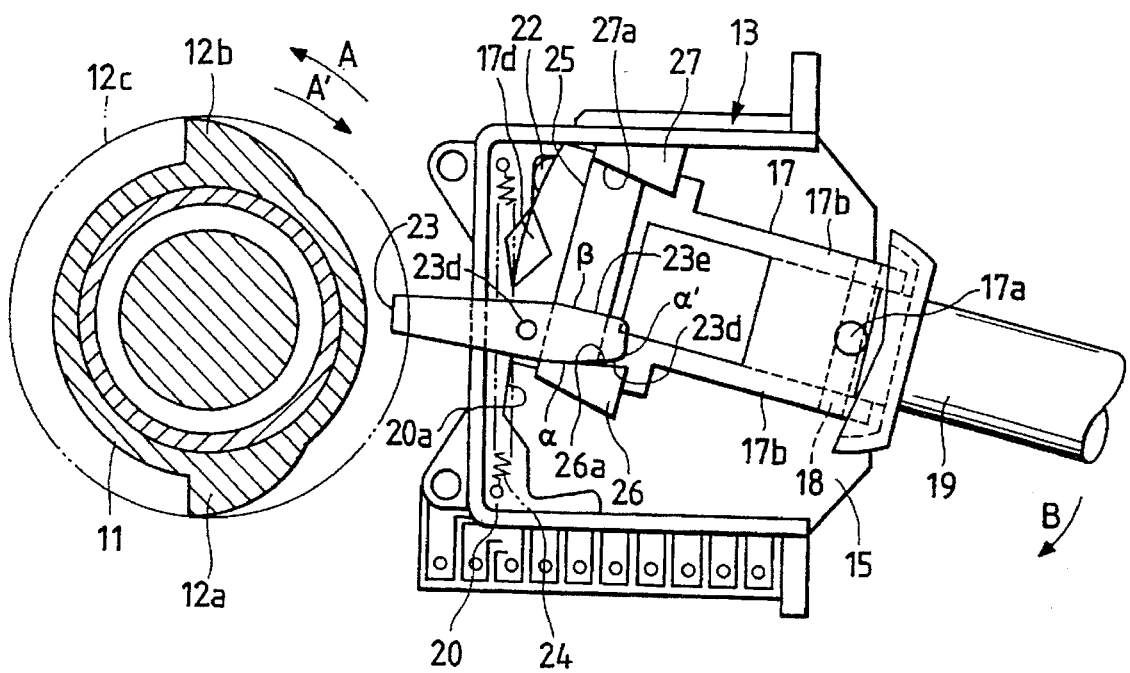
FIG. 6 is a view corresponding to FIG. 1, when the operation lever is rotationally operated to its right turn direction position.

Also, in this state, the projection spring 24 takes a dog-leg form and the ratchet 23 is energized forwardly. For this reason, if the bracket 17 is rotated to its right turn direction position or to its left turn direction position, then the securing portion 17d of the bracket 17 is caused to move and, as shown in FIG. 6, the ratchet 23 moves into the rotational locus 12c due to the restitutive force of the projection spring 24. Accordingly, in this state, if the cancel cams 12a, 12b are rotated, then the cancel cams 12a, 12b are engaged with the leading end portion of the ratchet 23, so that the ratchet 23 is pressed and rotated by the cancel cams 12a, 12b.

A back plate 25 is disposed on the upper surface of the bracket 17. As shown in FIG. 3, the back plate 25 includes a large diameter recessed portion 25a in the central portion of the lower surface thereof, and two small diameter groove portions 25b, 25b respectively formed on the two end sides of the large diameter recessed portion 25a. On the other hand, the bracket 17 includes two projected portions 17e, 17e on the upper surface thereof and, as shown in FIG. 5, the groove portions 25b of the back plate 25 are fitted with the projected portions 17e, respectively. This allows the back plate 25 to slide with respect to the bracket 17.

Figure 4B:
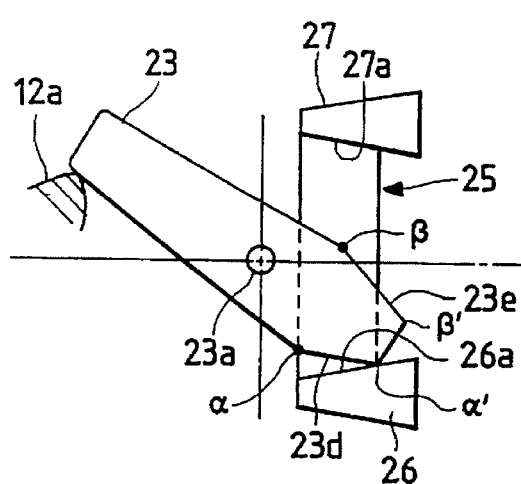
FIGS. 4 (a)–(d) are enlarged top plan views of a ratchet and a back plate, showing the contact state between them.
Figure 4A:
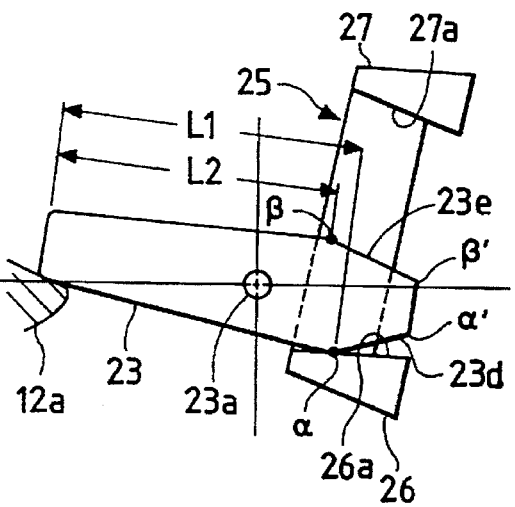

The back plate 25 includes on the upper surface thereof, as shown in FIG. 4, two projected portions 26, 27 which are respectively formed in a trapezoidal shape. On the other hand, the lower side of the base end portion of the ratchet 23 is cut away to thereby form a pressure surface 23d which is inclined. And, while the bracket 17 is being held at its right turn direction position, as shown in FIG. 4 (a), a point α, which is situated on the rotation center side of the pressure surface 23d, is in contact with the surface to be pressed 26a of the back plate 25.

Also, the upper side of the base end portion of the ratchet 23 is also cut away to thereby form an inclined pressure surface 23e. And, although not shown, while the bracket 17 is being held at its left turn direction position, a point β, which is situated on the rotation center side of the pressure surface 23e, is in contact with the surface to be pressed 27a of the back plate 25. The two pressure surfaces 23d, 23e of the ratchet 23 are inclined at different angles from each other, while the point α is situated on the right of the point β (that is, on the far side from the guide pin 23a).

The bracket 17 includes a recessed portion 17f in the upper surface thereof. And, in the recessed portion 25a of the back plate 25 and in the recessed portion 17f of the bracket 17, as shown in FIG. 2, there is stored a compression spring 28. Due to this, the pressure that is applied to the back plate 25 from the ratchet 23 can be transmitted to the bracket 17, thereby rotating the bracket 17 and operation lever 19.

Next, description will be given of the operation of the above-mentioned structure. At first, in FIG. 1, if the operation lever 19 situated at its neutral position is rotationally operated in a direction of an arrow B, then the bracket 17 is rotated and thus the securing portion 17d of the bracket 17 is moved, so that means to secure the securing pin 23b of the ratchet 23 no longer exists. Therefore, the ratchet 23 is allowed to advance and project along the groove portion 16b of the cover 16 due to the springy force of the projection spring 24.

And, as shown in FIG. 5, the guide pin 23a of the ratchet 23 is brought into contact with the end face of the groove portion 16b to thereby restrict the projection position of the ratchet 23 and, as shown in FIG. 6, the leading end portion of the ratchet 23 moves into the rotational locus 12c. Also, the engaging positions of the respective balls 22 with the uneven surface 20a are moved, so that the bracket 17 and operation lever 19 are respectively held at their respective right turn direction positions. At the same time, the point α, which is situated on the rotation center side of the pressure surface 23d, is brought into contact with the surface to be pressed 26a of the back plate 25. FIG. 4 (a) shows this state in an enlarged manner.

Figure 7:
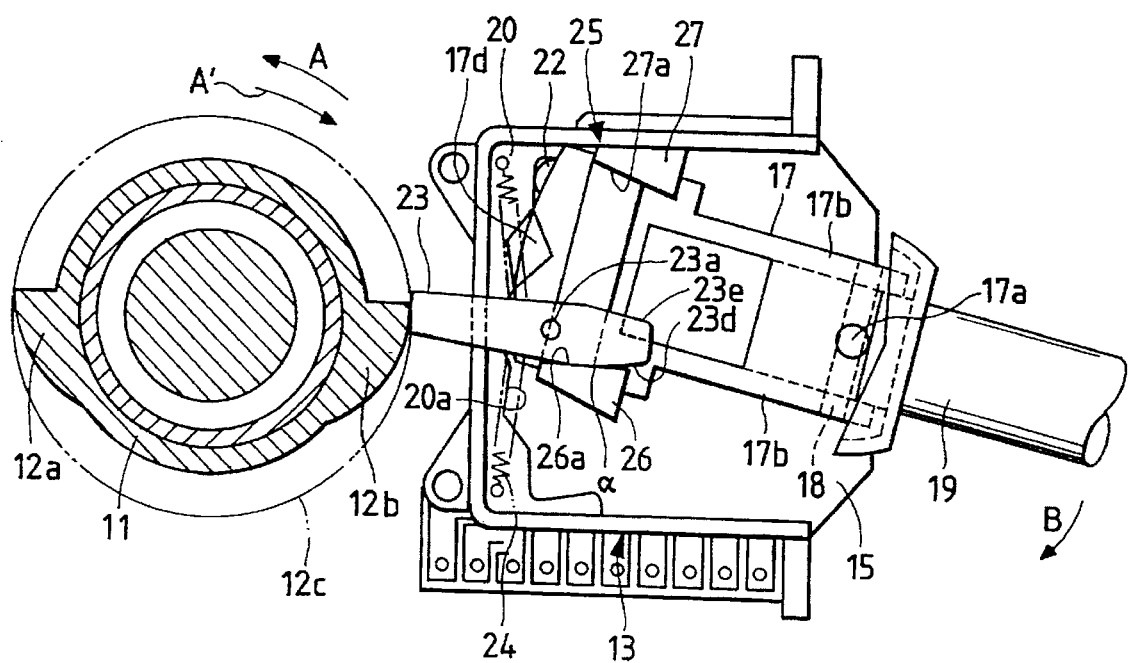
FIG. 7 is a view corresponding to FIG. 1, showing a state in which a ratchet runs onto a cancel cam.
Figure 8:
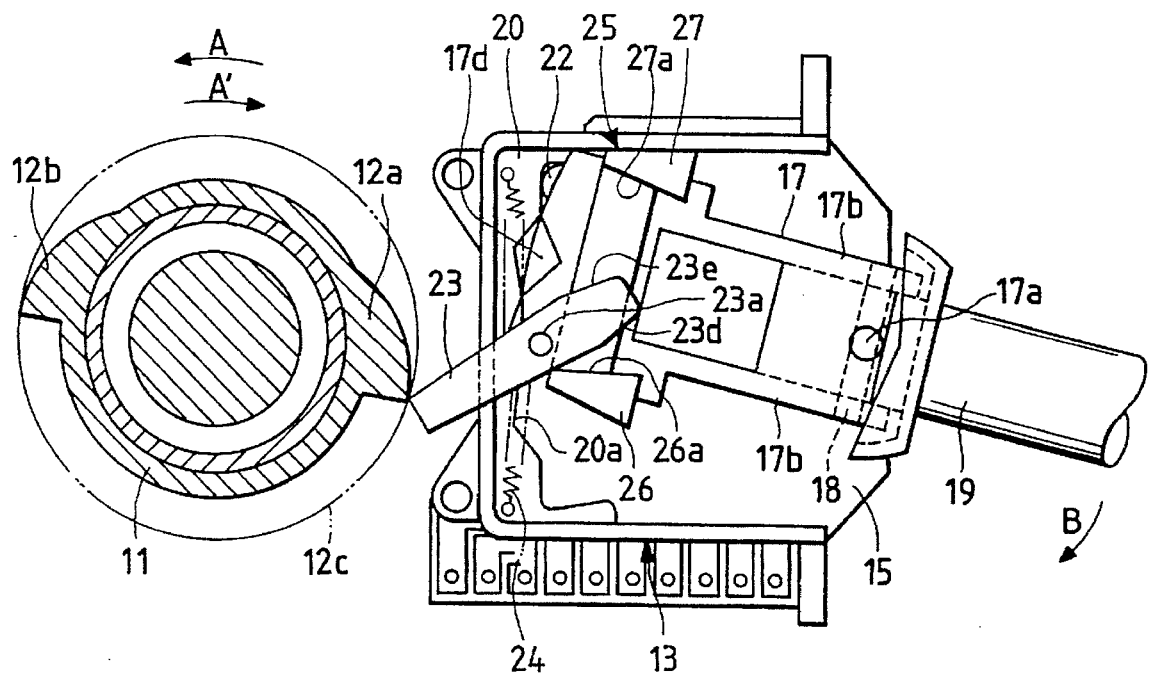
FIG. 8 is a view corresponding to FIG. 1, showing a state in which the ratchet is rotated.

In this state, if the steering wheel is turned to the right turn direction, then the cancel cams 12a, 12b are rotated in a direction of an arrow A' shown in FIGS. 6 and 7 and, as shown in FIG. 7, the leading end portion of the ratchet 23 runs onto the cancel cam 12b, which it encounters first, and is then moved back, so that the bracket 17 and operation lever 19 are respectively held at their respective right turn direction positions. Further, if the steering wheel is turned to the right turn direction, then, as shown in FIG. 8, the cancel cam 12a is brought into engagement with the leading end portion of the ratchet 23, so that the ratchet 23 is rotated in a direction opposite to a direction of an arrow B. However, since the rotational force of the ratchet 23 is not transmitted to the back plate 25, the bracket 17 and operation lever 19 remain at their respective right turn direction positions.

On the other hand, from a state shown in FIG. 6, when the steering wheel is turned in the left turn direction and thus the cancel cams 12a, 12b are rotated in a direction of an arrow A, the cancel cam 12a that encounters the ratchet 23 first does not engage with the ratchet 23, so that the bracket 17 and operation lever 19 remain at their respective right turn positions, respectively.

Figure 9:
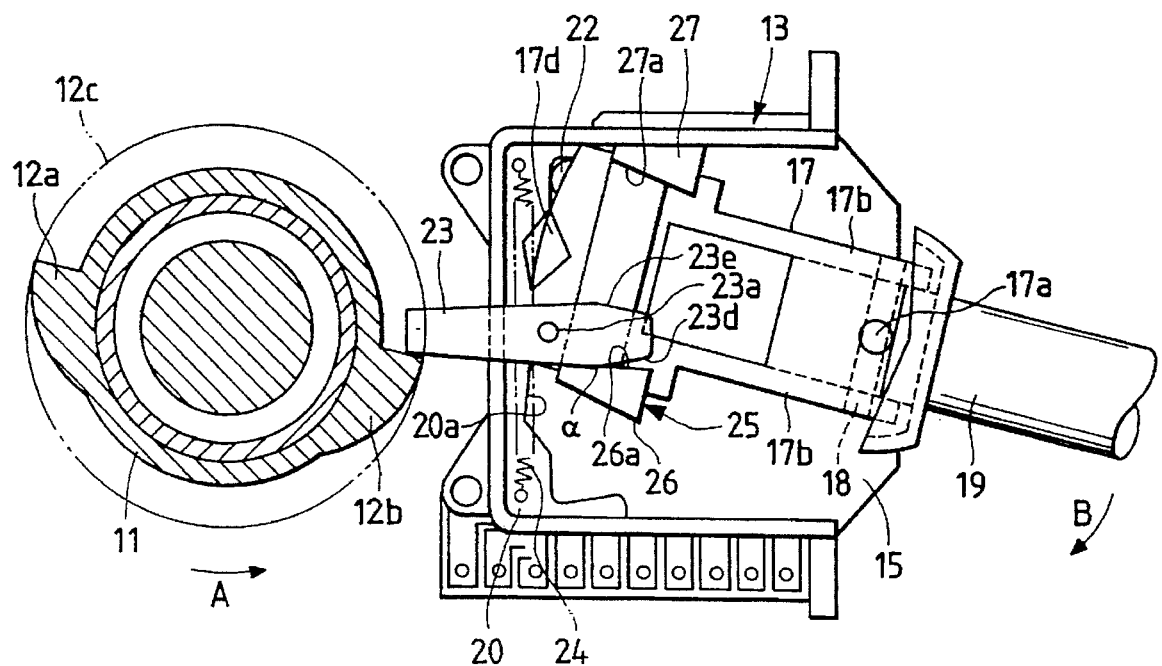
FIG. 9 is a view corresponding to FIG. 1, showing a state in which the ratchet is in engagement with a cancel cam.

From this state, if the cancel cams 12a, 12b are rotated in the arrow A direction, then the cancel cam 12b is brought into engagement with the ratchet 23, as shown in FIG. 9. And, the leading end portion of the ratchet 23 is rotated in the arrow B direction and, as shown in FIG. 4 (b), the contact portion between the pressure surface 23d of the ratchet 23 and the surface to be pressed 26a of the back plate 25 is moved sequentially from the point α of the ratchet 23 to a point α' situated on the base end portion side. At the same time, the back plate 25 is pushed by the ratchet 23 and this pressure is transmitted through the compression spring 28 to the bracket 17. As a result of this, the bracket 17 and operation lever 19 are rotated and returned to their respective neutral positions.

Figure 10:
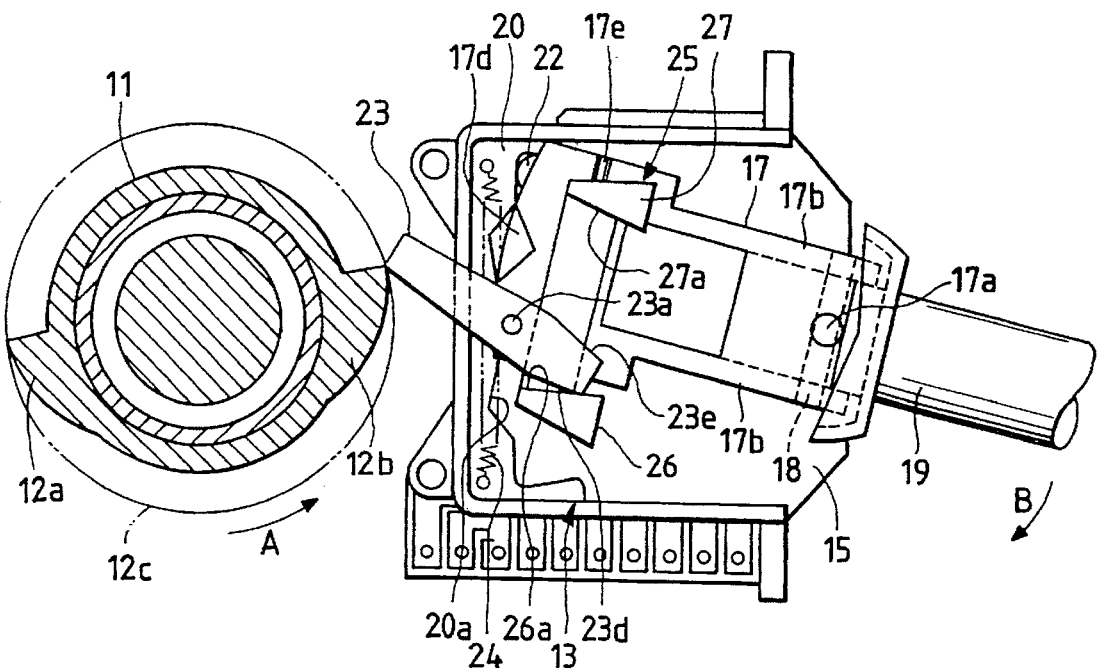
FIG. 10 is a view corresponding to FIG. 1, showing a state in which, with the operation lever fixed, a steering wheel is rotationally operated.
Figure 11:
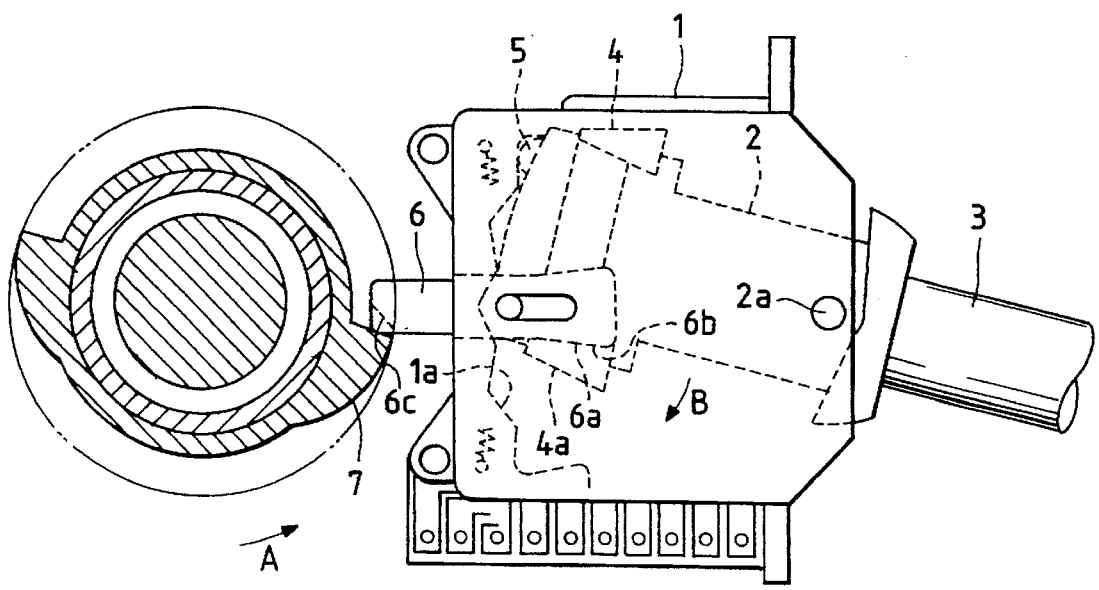
FIG. 11 is a top plan view of a conventional turn signal cancel device.

When the cancel cams 12a, 12b are rotated in the arrow A direction while the operation lever 19 is being fixed by the hand of a driver, as shown in FIG. 10, even if the ratchet 23 presses against the back plate 25, the compression spring 28 is contracted and thus only the back plate 25 is slid.

While the above description of the operation has been given of a case in which the operation lever 19 is rotated to the right turn direction position, the same description also applies similarly to a case in which the operation lever 19 is rotated to the left turn direction position. That is, while the bracket 17 is being held at the left turn direction position, if the cancel cams 12a, 12b are rotated, then the ratchet 23 is rotated and thus the contact portion between the pressure surface 23e of the ratchet 23 and the surface to be pressed 27a of the back plate 25 is moved from the point β to a point β' situated on the base end portion side. At the same time, the back plate 25 is pushed and thus the bracket 17 and operation lever 19 are rotated and returned to their respective neutral positions.

According to the above embodiment, since the pressure surfaces 23d and 23e of the ratchet 23 are respectively so formed as to be inclined, the pressing operation of the back plate 25 by the ratchet 23 is performed on the rotation center side (the point α or β) of the ratchet 23 which is rotated at a relatively slow speed and, after then, on the end portion side (the point α' or β') thereof which is rotated at a high speed. Therefore, the fast turning of the steering wheel is difficult to reflect on the rotational operation of the bracket 17, thereby preventing the fast turn of the steering wheel from reflecting on the rotational operation of the bracket 2. Also, since it is not necessary to change the quantity of rotation of the ratchet 23, reduce a possibility that the turn of the steering wheel does not reflect on rotational operation of the bracket 2.

On the other hand, according to the present embodiment, since the point β is situated closer to the rotation center 23a side than the point α due to the different angles of inclination of the pressure surfaces 23d, 23e of the ratchet 23, when the bracket 17 is rotated from the left turn direction position to the neutral position, the back plate 25 is pressed at the point β of the ratchet 23 where the ratchet 23 is rotated at a slow speed, thereby being able to prevent occurrence of the above-mentioned overrun.

In the above-mentioned embodiment, the pressure surfaces 23d and 23e of the ratchet 23 are so formed as to be inclined. However, the shape of the pressure surfaces 23d and 23e is not limited to this but, for example, they can be formed in an arc-shaped surface. The condition that must be satisfied is that the contact portion between the pressure surface of the ratchet 23 and the surface to be pressed of the back plate 25 can be moved from the rotation center side of the ratchet 23 to the leading end portion side thereof.

Also, in the above-mentioned embodiment, the pressure surfaces 23c and 23d of the ratchet 23 are so formed as to be inclined, whereby the contact portions between the pressure surfaces 23c and 23d of the ratchet 23 and the surfaces to be pressed 26a and 27a of the back plate 25 are moved to the leading end portion side of the ratchet 23. However, alternatively, the surfaces to be pressed 26a and 27a of the back plate 25 may be formed in such manner that they are inclined.

As can be understood clearly from the foregoing description, according to the turn signal cancel device of the invention, the pressing operation of the back plate can be performed first on the rotation center side of the ratchet which is rotated at a relatively slow speed and, after then, on the end portion side thereof which is rotated at a high speed. Due to this, the fast turning of the steering wheel is difficult to reflect on the rotational operation of the bracket, thereby being able to prevent the fast turn of the steering wheel from reflecting on the rotational operation of the bracket. Also, since it is not necessary to change the quantity of rotation of the ratchet, reduce a possibility that the turn of the steering wheel does not reflect on rotational operation of the bracket.

What is claimed is:

1. A turn signal cancel device comprising:
   a bracket rotatably mounted and including an operation lever and a back plate having a pressed mender;
   holding means for selectively holding the bracket at one of a neutral position, a right turn direction position and a left turn direction position;
   a ratchet having a pressure member for pressing against the back plate of the bracket held at one of a right turn direction position and a left turn direction position in response to a rotation of a steering wheel so as to rotate and return the bracket to the neutral position, said ratchet including a center of rotation; and
   the pressure member and the pressed member being formed in such a manner that a contact position defined between the pressure member and the pressed member is moved away from the center of rotation of the ratchet during rotation of the ratchet, wherein the pressure member includes a pair of press surfaces which differ in angle of inclination from each other.

2. A turn signal cancel device comprising:

a bracket rotatably mounted and including an operation lever and a back plate having a pressed member;

holding means for selectively holding the bracket at one of a neutral position, a right turn direction position and a left turn direction position;

a ratchet having a pressure member for pressing against the back plate of the bracket held at one of a right turn direction position and a left turn direction position in response to a rotation of a steering wheel so as to rotate and return the bracket to the neutral position, said ratchet including a center of rotation; and the pressure member and the pressed member being formed in such a manner that a contact position defined between the pressure member and the pressed member is moved away from the center of rotation of the ratchet during rotation of the ratchet, wherein the pressed member includes a pair of pressed surfaces which differ in angle of inclination from each other.

* * * * *

UNITED STATES PATENT AND TRADEMARK OFFICE
CERTIFICATE OF CORRECTION

PATENT NO. : 5,646,384
DATED : July 08, 1997
INVENTOR(S) : Yoshimi NORO et al.

It is certified that error appears in the above-indentified patent and that said Letters Patent is hereby corrected as shown below:

In Claim 1, Col. 6, line 56, "mender" should read --member--.

Signed and Sealed this

Twenty-fifth Day of November, 1997

Attest:

BRUCE LEHMAN

Attesting Officer

Commissioner of Patents and Trademarks